US009670780B2

(12) United States Patent
Baxley

(10) Patent No.: US 9,670,780 B2
(45) Date of Patent: Jun. 6, 2017

(54) TIE SHAFT FLOW TRIP

(71) Applicant: United Technologies Corporation, Hartford, CT (US)

(72) Inventor: Richard C. Baxley, Higganum, CT (US)

(73) Assignee: United Technologies Corporation, Hartford, CT (US)

( * ) Notice: Subject to any disclaimer, the term of this patent is extended or adjusted under 35 U.S.C. 154(b) by 7 days.

(21) Appl. No.: 14/774,196

(22) PCT Filed: Feb. 18, 2014

(86) PCT No.: PCT/US2014/016796
§ 371 (c)(1),
(2) Date: Sep. 10, 2015

(87) PCT Pub. No.: WO2014/186016
PCT Pub. Date: Nov. 20, 2014

(65) Prior Publication Data
US 2016/0024927 A1   Jan. 28, 2016

Related U.S. Application Data

(60) Provisional application No. 61/775,879, filed on Mar. 11, 2013.

(51) Int. Cl.
*F01D 5/08*  (2006.01)
*F01D 5/06*  (2006.01)
*F01D 25/12*  (2006.01)

(52) U.S. Cl.
CPC .............. *F01D 5/06* (2013.01); *F01D 5/082* (2013.01); *F01D 5/085* (2013.01); *F01D 25/12* (2013.01); *F01D 5/066* (2013.01); *F05D 2220/32* (2013.01); *F05D 2240/20* (2013.01); *F05D 2240/60* (2013.01); *F05D 2250/11* (2013.01); *F05D 2250/232* (2013.01);
(Continued)

(58) Field of Classification Search
CPC . F01D 5/066; F01D 5/06; F01D 25/08; F01D 25/10; F01D 25/12; F01D 5/186; F01D 5/187; F01D 5/082; F01D 5/085; F01D 5/088; F02C 7/20; F05D 2260/22141; F05D 2260/211; F05D 2240/60; F05D 2250/11; F05D 2250/232
USPC ....... 415/115, 116, 180; 416/95, 96 R, 97 R, 416/198 A, 201 R
See application file for complete search history.

(56) References Cited

U.S. PATENT DOCUMENTS 2,973,938 A   3/1961   Alford
3,647,313 A   3/1972   Koff
4,719,747 A   1/1988   Willkop et al.
(Continued)

OTHER PUBLICATIONS

International Preliminary Report on Patentability for PCT Application No. PCT/US2014/016796, mailed Sep. 24, 2015.
(Continued)

*Primary Examiner* — Christopher Verdier
(74) *Attorney, Agent, or Firm* — Carlson, Gaskey & Olds, P.C.

(57) ABSTRACT

A compressor section includes, among other things, a tie shaft assembly including a shaft and one or more projections extending radially outward from the shaft. The projections are configured to redirect air communicated from between the one or more rotor stages and the shaft.

14 Claims, 2 Drawing Sheets

(52) U.S. Cl.
CPC ............... *F05D 2260/211* (2013.01); *F05D 2260/22141* (2013.01); *Y02T 50/676* (2013.01)

(56) References Cited

U.S. PATENT DOCUMENTS

| | | |
|---|---|---|
| 4,793,772 A | 12/1988 | Zaehring et al. |
| 4,808,073 A | 2/1989 | Zaehring et al. |
| 5,054,996 A | 10/1991 | Carreno |
| 5,271,711 A | 12/1993 | McGreehan et al. |
| 5,472,313 A | 12/1995 | Quinones et al. |
| 5,537,814 A * | 7/1996 | Nastuk ................ F01D 5/066 60/796 |
| 5,685,158 A | 11/1997 | Lenahan et al. |
| 6,267,553 B1 | 7/2001 | Burge |
| 6,808,362 B1 | 10/2004 | Glahn et al. |
| 7,775,764 B2 | 8/2010 | Snowsill et al. |
| 2006/0245917 A1 | 11/2006 | Burkhardt |
| 2007/0189890 A1 | 8/2007 | Snowsill et al. |
| 2012/0003091 A1 | 1/2012 | Sergovia |

OTHER PUBLICATIONS

International Search Report and Written Opinion for PCT Application No. PCT/US2014/016796 mailed Dec. 12, 2014.
Supplementary European Search Report for Application No. 14797592.4 mailed Nov. 8, 2016.

\* cited by examiner

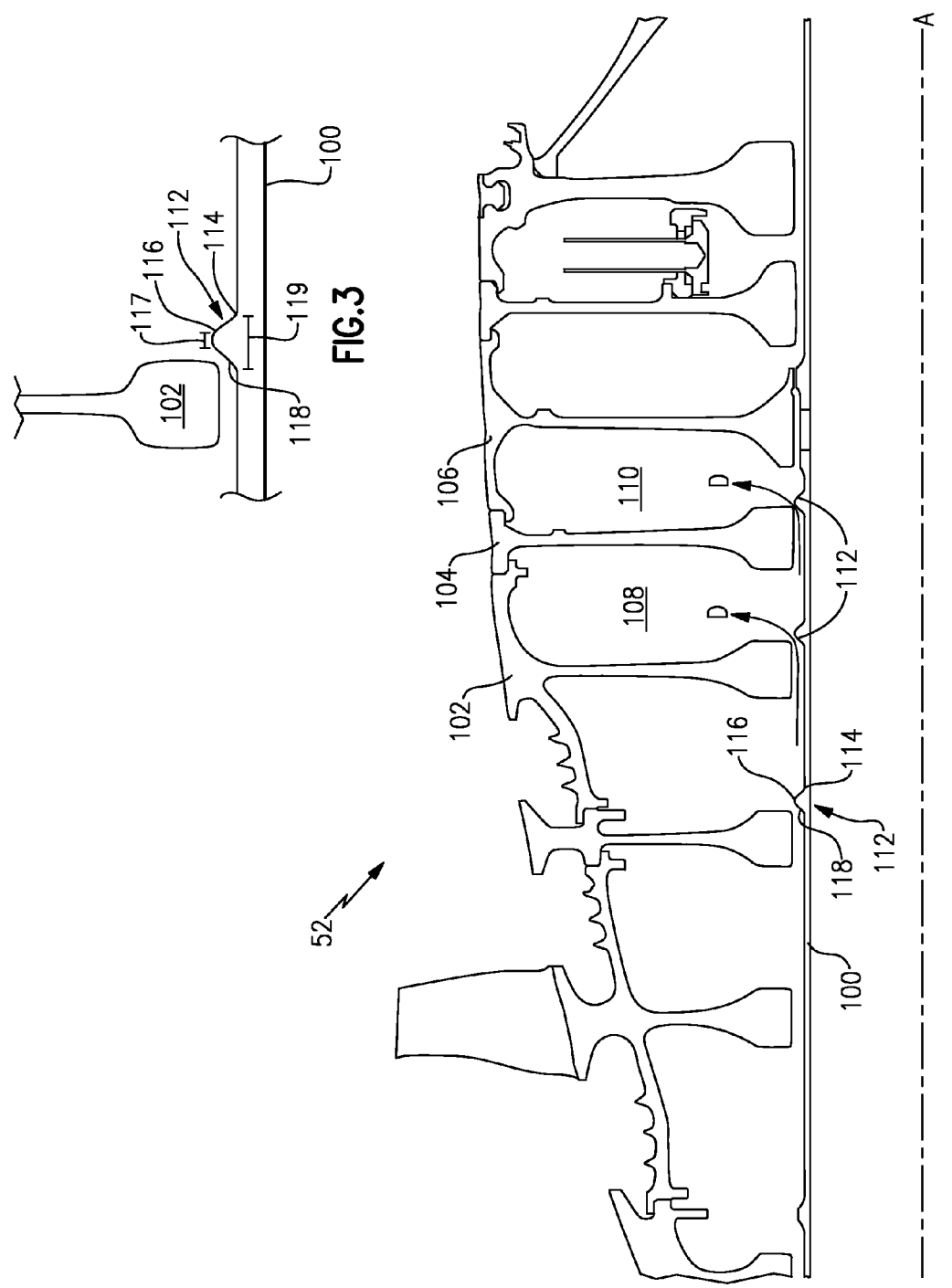

TIE SHAFT FLOW TRIP

BACKGROUND

This disclosure relates to a tie shaft for a compressor.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

The compressor section typically includes one or more rotor stages. The rotor stages are stacked discs connected to one another by a tie shaft. The tie shaft prevents rotation of the discs relative to one another. In between the discs, there may be a dead air space. The lack of convection in the dead air space may lead to temperature increases within the compressor section.

SUMMARY

A compressor section according to an exemplary aspect of the present disclosure includes, among other things, a tie shaft assembly including a shaft and one or more projections extending radially outward from the shaft. The projections are configured to redirect air communicated from between the one or more rotor stages and the shaft.

In a further non-limiting embodiment of the foregoing compressor section, the one or more rotor stages are integrally bladed rotors.

In a further non-limiting embodiment of either of the foregoing compressor sections, the projections have a base section and a peak section. The base section has an axial width greater than an axial width of the peak section.

In a further non-limiting embodiment of either of the foregoing compressor sections, the one or more projections extend radially from the shaft for a distance less than the distance between the one or more rotor stages and the shaft.

In a further non-limiting embodiment of either of the foregoing compressor sections, the diameter of the shaft is 5 inches (127 mm) and the one or more projections extend radially from the shaft for a distance of 0.2 inches (5.08 mm).

In a further non-limiting embodiment of either of the foregoing compressor sections, a portion of at least one of the one or more projections is positioned directly aft of at least one of the one or more rotor stages.

In a further non-limiting embodiment of either of the foregoing compressor sections, a peak of the at least one projection is positioned directly aft of the at least one rotor stage.

In a further non-limiting embodiment of either of the foregoing compressor sections, a leading edge of the at least one projection is positioned under the at least one rotor stage.

In a further non-limiting embodiment of either of the foregoing compressor sections, the one or more projections are machined into the tie shaft.

In a further non-limiting embodiment of either of the foregoing compressor sections, the one or more projections are configured to direct air radially away from the shaft.

A gas turbine engine according to an exemplary aspect of the present disclosure includes, among other things, a compressor section with a tie shaft and one or more rotor stages arranged on the tie shaft. The tie shaft includes one or more projections extending radially outward from the tie shaft. The projections are configured to direct air communicated from between the one or more rotor stages and the tie shaft to one or more spaces between the one or more rotor stages.

In a further non-limiting embodiment of either of the foregoing gas turbine engines, the rotor stages are integrally bladed rotors.

In a further non-limiting embodiment of either of the foregoing gas turbine engines, the one or more projections have a base section and a peak section, and the base section has an axial width greater than an axial width of the peak section.

In a further non-limiting embodiment of either of the foregoing gas turbine engines, the one or more projections extend radially from the tie shaft for a distance less than the distance between the one or more rotor stages and the tie shaft.

In a further non-limiting embodiment of either of the foregoing gas turbine engines, the diameter of the tie shaft is 5 inches (127 mm) and the one or more projections extend radially from the shaft for a distance of 0.2 inches (5.08 mm).

In a further non-limiting embodiment of either of the foregoing gas turbine engines, a portion of at least one of the one or more projections is positioned directly aft of at least one of the one or more rotor stages.

In a further non-limiting embodiment of either of the foregoing gas turbine engines, a peak of the at least one projection is positioned directly aft of the at least one rotor stage.

In a further non-limiting embodiment of either of the foregoing gas turbine engines, a leading edge of the at least one projection is positioned under the at least one rotor stage.

In a further non-limiting embodiment of either of the foregoing gas turbine engines, the one or more projections are configured to direct air radially away from the tie shaft.

A method of cooling a compressor section according to another exemplary aspect of the present disclosure includes, among other things, providing one or more rotor stages arranged on a tie shaft, and providing one or more projections extending radially outward from the tie shaft to direct air between one or more rotor stages.

Although the different examples have the specific components shown in the illustrations, embodiments of this disclosure are not limited to those particular combinations. It is possible to use some of the components or features from one of the examples in combination with features or components from another one of the examples.

BRIEF DESCRIPTION OF THE DRAWINGS

FIG. 2 illustrates a schematic compressor section of the gas turbine engine.

FIG. 3 illustrates a detail view of the schematic compressor section of FIG. 2.

DETAILED DESCRIPTION

Figure 1:
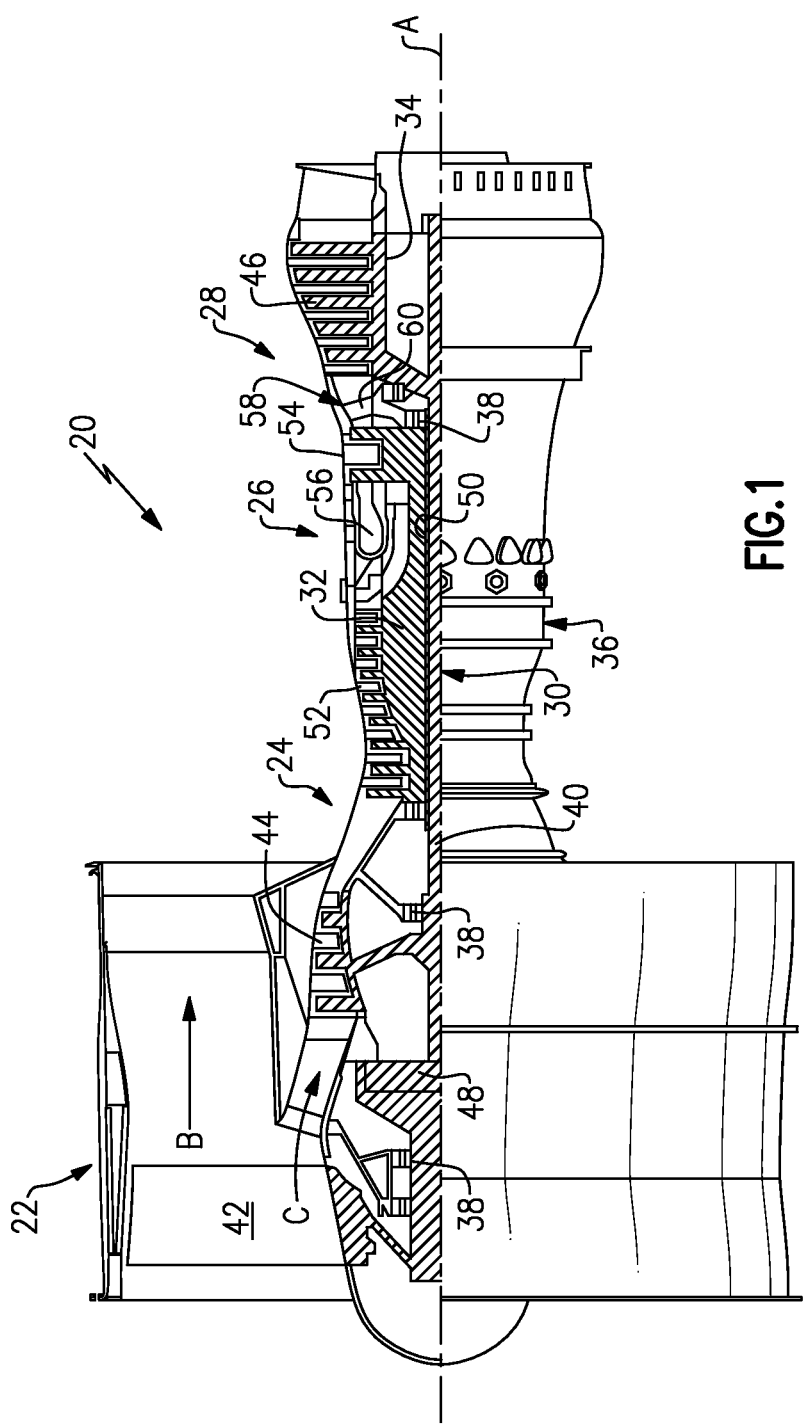
FIG. 1 illustrates a schematic, cross-sectional view of a gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

It should be understood that the tie shaft described herein may be utilized in the high pressure compressor 52, in the low pressure compressor 44, or in a compressor section of another type of engine.

As is shown schematically in FIG. 2, the high pressure compressor section 52 may include a plurality of rotor stages 102, 104, 106 arranged on a tie shaft 100. In the example shown, the rotor stages 102, 104, 106 are integrally bladed rotors (IBRs). In another example, the rotor stages 102, 104, 106 may be another type of rotor.

The tie shaft 100 may be used to apply a compressive force to the rotor stages 102, 104, 106, which acts (with frictional forces) to prevent the stages 102, 104, 106 from spinning relative to one another. In between the stages 102, 104, 106, there may be an air space 108, 110. Such an air space 108, 110 may have poor air convection, which may cause increases in temperature within the compressor section 52.

The tie shaft 100 includes one or more flow trips 112. The flow trips 112 may be projections extending radially outward from tie shaft 100 towards the compressor stages 102, 104, 106. Referring to FIG. 3, the flow trips 112 may have a base section 114 and a peak section 116. The peak section 116 may have a smaller axial width 117 than an axial width 119 of the base section 114.

Referring again to FIG. 2, as air flow D travels along the tie shaft 100 in the aft direction, the flow trip 112 deflects the air into the air space 108, 110. The deflected air D provides increased convection in between the stages 102, 104, 106, which may provide a cooling effect in the air space 108, 110.

As is shown in FIGS. 2 and 3, a portion of the flow trips 112 may be positioned aft of one or more of the stages 102, 104, 106. In one example, the peak 116 of the flow trip 112 may be positioned aft of one or more of the rotor stages 102, 104, 106 while a leading edge 118 of the flow trip is positioned under the rotor stage 102, 104, 106.

In one example, the flow trips 112 may have a height that is less than the clearance between the stages 102, 104, 106 and the tie shaft 100 to allow for stacking the rotor stages 102, 104, 106 over the tie shaft 100. For instance, the tie shaft 100 may have a diameter of 5 inches (127 mm) and the flow trip 112 height may be 0.2 inches (5.08 mm). In one example, the flow trip 112 height is determined by the diameter of a bore (not shown) in the rotor stages 102, 104, 106 which receives the tie shaft 100.

The flow trips 112 may be machined into the tie shaft 100 by milling. If the flow trips 112 are positioned at an angle with respect to the engine axis A, turning may be required to machine the flow trips 112. In another example, flow trips 112 may be welded to the tie shaft 100.

Although an embodiment of this invention has been disclosed, a worker of ordinary skill in this art would recognize that certain modifications would come within the scope of this invention. For that reason, the following claims should be studied to determine the true scope and content of this invention.

I claim:

1. A compressor section, comprising:
    one or more rotor stages;
    a tie shaft assembly including a shaft; and
    one or more projections extending radially outward from the shaft, the projections configured to redirect air communicated from between the one or more rotor stages and the shaft, wherein at least one of the projections has a peak and a leading edge, the peak positioned directly aft one of the rotor stages, the leading edge positioned under the one of the rotor stages.

2. The compressor section of claim 1, wherein the one or more rotor stages are integrally bladed rotors.

3. The compressor section of claim 1, wherein the projections have a base section and a peak section, and wherein the base section has an axial width greater than an axial width of the peak section.

4. The compressor section of claim 1, wherein the one or more projections extend radially from the shaft for a distance less than the distance between the one or more rotor stages and the shaft.

5. The compressor section of claim 1, wherein the diameter of the shaft is 5 inches (127 mm) and the one or more projections extend radially from the shaft for a distance of 0.2 inches (5.08 mm).

6. The compressor section of claim 1, wherein the one or more projections are machined into the tie shaft.

7. The compressor section of claim 1, wherein the one or more projections are configured to direct air radially away from the shaft.

8. A gas turbine engine, comprising:
    a compressor section including a tie shaft and one or more rotor stages arranged on the tie shaft, wherein the tie shaft includes one or more projections extending radially outward from the tie shaft and configured to direct air communicated from between the one or more rotor stages and the tie shaft to one or more spaces between the one or more rotor stages, wherein at least one of the projections has a peak and a leading edge, the peak positioned directly aft one of the rotor stages, the leading edge positioned under the one of the rotor stages.

9. The gas turbine engine of claim 8, wherein the rotor stages are integrally bladed rotors.

10. The gas turbine engine of claim 8, wherein the one or more projections have a base section and a peak section, and wherein the base section has an axial width greater than an axial width of the peak section.

11. The gas turbine engine of claim 8, wherein the one or more projections extend radially from the tie shaft for a distance less than the distance between the one or more rotor stages and the tie shaft.

12. The gas turbine engine of claim 8, wherein the diameter of the tie shaft is 5 inches (127 mm) and the one or more projections extend radially from the tie shaft for a distance of 0.2 inches (5.08 mm).

13. The compressor section of claim 8, wherein the one or more projections are configured to direct air radially away from the tie shaft.

14. A method of cooling a compressor section, comprising:
    providing one or more rotor stages arranged on a tie shaft; and
    providing one or more projections extending radially outward from the tie shaft to direct air between one or more rotor stages, wherein at least one of the projections has a peak and a leading edge, the peak positioned directly aft one of the rotor stages, the leading edge positioned under the one of the rotor stages.

* * * * *